(12) United States Patent
Stoicescu et al.

(10) Patent No.: US 10,458,431 B2
(45) Date of Patent: Oct. 29, 2019

(54) VOLUTES FOR ENGINE MOUNTED BOOST STAGES

(71) Applicant: Hamilton Sundstrand Corporation, Charlotte, NC (US)

(72) Inventors: Adrian L. Stoicescu, Roscoe, IL (US); Benjamin T. Harder, DeKalb, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 380 days.

(21) Appl. No.: 15/483,503

(22) Filed: Apr. 10, 2017

(65) Prior Publication Data

US 2018/0291921 A1 Oct. 11, 2018

(51) Int. Cl.
| | | |
|---|---|---|
| *F04D 29/44* | (2006.01) | |
| *F04D 29/42* | (2006.01) | |
| *F02C 7/22* | (2006.01) | |
| *F04D 7/02* | (2006.01) | |
| *F02C 7/236* | (2006.01) | |

(52) U.S. Cl.
CPC ............ *F04D 29/4293* (2013.01); *F02C 7/22* (2013.01); *F02C 7/236* (2013.01); *F04D 7/02* (2013.01); *F04D 29/426* (2013.01); *F04D 29/445* (2013.01); *F05D 2230/10* (2013.01); *F05D 2250/74* (2013.01); *Y02T 50/673* (2013.01)

(58) Field of Classification Search
CPC ............ F05D 2250/74; F04D 29/2277; F04D 29/445; F04D 1/025

USPC .................................................. 415/203, 204
See application file for complete search history.

(56) References Cited

U.S. PATENT DOCUMENTS

| | | | | |
|---|---|---|---|---|
| 8,591,183 | B2* | 11/2013 | Lyons | F04D 29/4226 |
| | | | | 415/206 |
| 8,944,767 | B2* | 2/2015 | Stoicescu | F04D 29/2277 |
| | | | | 416/175 |
| 9,546,625 | B2* | 1/2017 | Stoicescu | F02M 37/18 |
| 9,562,502 | B2* | 2/2017 | Stoicescu | F02M 37/08 |
| 9,581,046 | B2* | 2/2017 | Hoshi | F04D 29/441 |
| 9,745,983 | B2* | 8/2017 | Pihet | F04D 29/4226 |
| 2005/0281669 | A1* | 12/2005 | Sohn | F04D 29/422 |
| | | | | 415/204 |
| 2013/0183148 | A1 | 7/2013 | Stoicescu et al. | |
| 2016/0097399 | A1 | 4/2016 | Stoicescu et al. | |

OTHER PUBLICATIONS

Extended European search report for European Patent Application No. 18166676.9, dated Aug. 6, 2018.

* cited by examiner

*Primary Examiner* — Lindsay M Low
*Assistant Examiner* — James J Kim
(74) *Attorney, Agent, or Firm* — Locke Lord LLP; Scott D. Wofsy; Joshua L. Jones

(57) ABSTRACT

A boost pump includes a housing cover and a pump housing engaged opposite to the housing cover. Volute passages are defined between the housing cover and the pump housing. The volute passages include a circumferentially extending volute defining a plurality of cross sections defined in a housing including the pump housing and the housing cover. The plurality of surfaces are defined as a set of dimensions set out in at least one of TABLES 1 through 3.

20 Claims, 10 Drawing Sheets

FIG. 2A   FIG. 2B

VOLUTES FOR ENGINE MOUNTED BOOST STAGES

BACKGROUND OF THE INVENTION

1. Field of the Invention

The present disclosure relates to an aircraft jet engine mounted fuel boost pump, in particular to the volute collector geometric definition.

2. Description of Related Art

The engine mounted boost pump is commonly packaged together with the main fuel pump, which is usually of a positive displacement gear pump type, both being driven by a common shaft. The fuel leaving the boost stage goes through a filter and a fuel oil heat exchanger before entering the main pump. Pressure losses are introduced by these components and the associated plumbing, while heat is also added to the fuel. The fuel feeding the boost pump comes from the main frame fuel tanks through the main frame plumbing. The tanks are usually vented to the ambient atmospheric pressure, or, in some cases, are pressurized a two or three pounds per square inch (psi), or 0.136 atm to 0.204 atm, above that. The tanks are provided with immersed pumping devices, which are in some cases axial flow pumps driven by electric motors or turbines, or in other cases ejector pumps. These devices are called here in main frame boost pumps.

During flight, the pressure in the tank decreases with altitude following the natural depression in the ambient atmospheric pressure. Under normal operating conditions, industry standards require the main frame boost pumps to provide uninterrupted flow to the engine mounted boost pumps at a minimum of 5 psi (0.340 atm) above the true vapor pressure of the fuel and with no V/L (vapor liquid ratio) or no vapor present as a secondary phase. Under abnormal operation, which amounts to inoperable main frame boost pumps, the pressure at the inlet of the engine mounted boost stage pumps can be only 2, or 3 psi (0.136 atm to 0.204 atm) above the fuel true vapor pressure, while vapor can present up to a V/L ratio of 0.45, or more. Definition of conventional terms, recommended testing practices, and fuel physical characteristics are outlined in industry specifications and standards like Coordinating Research Council Report 635, AIR 1326, SAE ARP 492, SAE ARP 4024, ASTM D 2779, and ASTM D 3827 to name only a few.

During normal or abnormal operation, the engine mounted boost pump is required to maintain enough pressure at the main pump inlet under all the operating conditions encountered in a full flight mission such the main pump can maintain the demanded output flow and pressure to the fuel control and metering unit for continuous and uninterrupted engine operation. There are also limitations in the maximum pressure rise the engine mounted boost pump is allowed to deliver such as not to exceed the mechanical pressure rating of the fuel oil heat exchanger, or limitations pertaining to minimum impeller blade spacing such that a large contaminant like a bolt lost from maintenance interventions would pass through and be trapped safely in the downstream filter. All these requirements along with satisfying a full flow operating range from large flows during takeoff to a trickle of flow during flight idle descent, and fuel temperature swings from −40 F to 300 F (−40 C to 148.9 C), makes the aerodynamic design of the engine mounted fuel pumps a serious challenge.

The conventional techniques have been considered satisfactory for their intended purpose. However, there is an ever present need for improved boost pumps. This disclosure provides a solution for this need.

SUMMARY OF THE INVENTION

A boost pump includes a housing cover and a pump housing engaged opposite to the housing cover. Volute passages are defined between the housing cover and the pump housing. The volute passages include a circumferentially extending volute defining a plurality of cross sectional surfaces defined in a housing including the pump housing and the housing cover. The plurality of surfaces are defined as a set of dimensions set out in at least one of TABLES 1 through 3, wherein Alpha is an angular measure circumferentially around the volute starting from a point where a diffuser section is tangent to a main volute section, h is a radial channel span distance in the volute, h_0 is a radial span in an exit bend of the volute, rbase is a radius from an axis of rotation of an impeller that rotates within the pump housing to a radially inward extreme of the volute, b is a volute thickness measured in a direction parallel to the axis, R is an inner radius of the exit bend of the volute measured from a point having Cartesian coordinates O1_X, O2_Y, and O3_Z, and Beta is an angle angular measure circumferentially around the point C of radius R measured starting from an angle 10° from being parallel to alpha equals 0°.

A split line can be defined between the housing cover and the pump housing, e.g., wherein the split line is centered axially in the main volute section. The diffuser section can be in fluid communication with an exit port of the volute oriented parallel with the volute thickness b. The main volute section can be defined as a set of dimensions set out in TABLES 1 and 2. The diffuser section can be defined as a set of dimensions set out in TABLE 3. Two adjacent corners of the volute in a section of the volute defined by TABLE 1 can include a normalized fillet radius of 0.032, normalized with in common with TABLE 1. A central radius between two adjacent corners of a volute section of the volute defined by TABLE 1 can have a normalized value of 0.15625, normalized in common with TABLE 1. There can be a normalized central radius 0.15625 in one volute surface parallel to dimension b in a section of the volute defined by TABLE 2, normalized in common with TABLE 2. All four corners in radial cross-section of the exit bend of the volute can have a fillet radius with a normalized value of 0.15625, normalized in common with TABLE 3.

A method of forming a volute in a boost fuel pump includes forming axially opposed portions of a volute in a housing cover and an opposed pump housing, wherein the volute a plurality of cross-sections defined in the housing cover and pump housing, wherein the plurality of surfaces are defined as described above. The method can include forming the volute geometry in the pump housing and the opposed housing cover using a single four axis milling cutter.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

Figure 7:
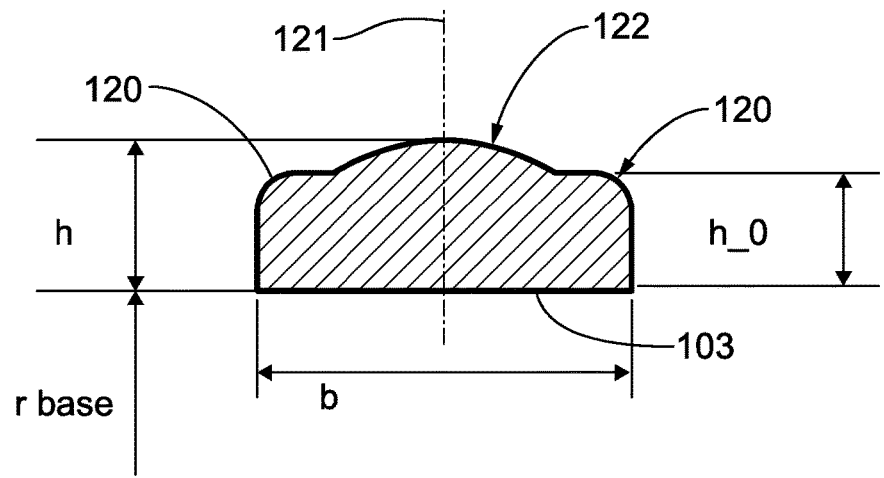
FIG. 7 is a schematic cross-sectional view of the volute of FIG. 1, showing the radial cross-section identified in FIG. 6 as 7-7.
Figure 8:
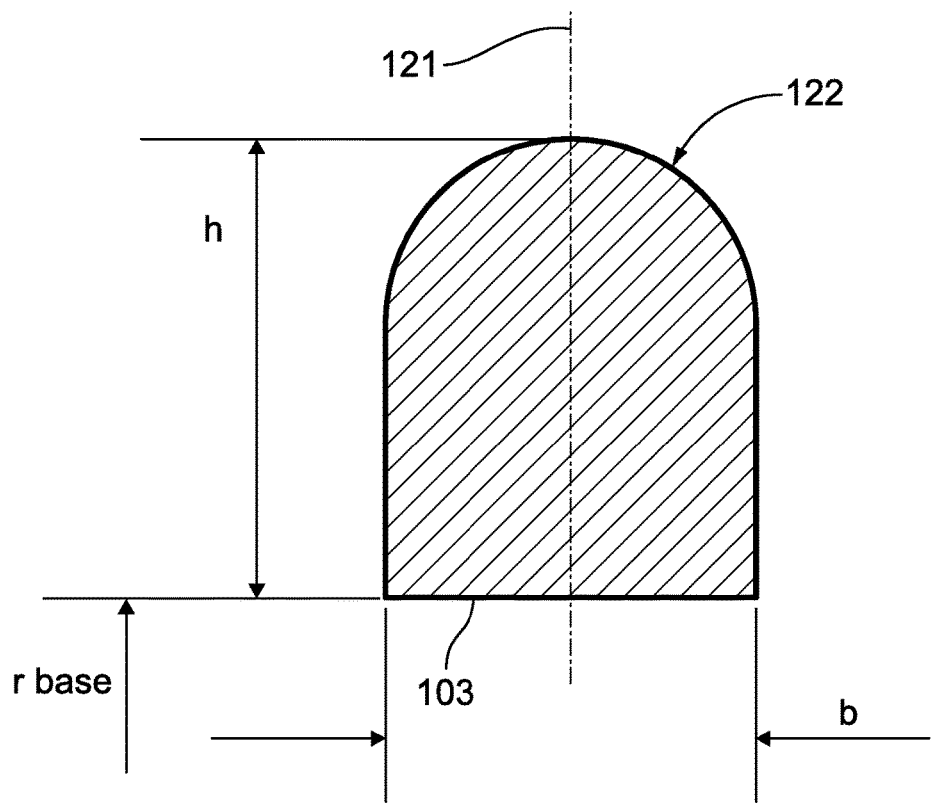
FIG. 8 is a schematic cross-sectional view of the volute of FIG. 1, showing the radial cross-section identified in FIG. 6 as 8-8.
Figure 11:
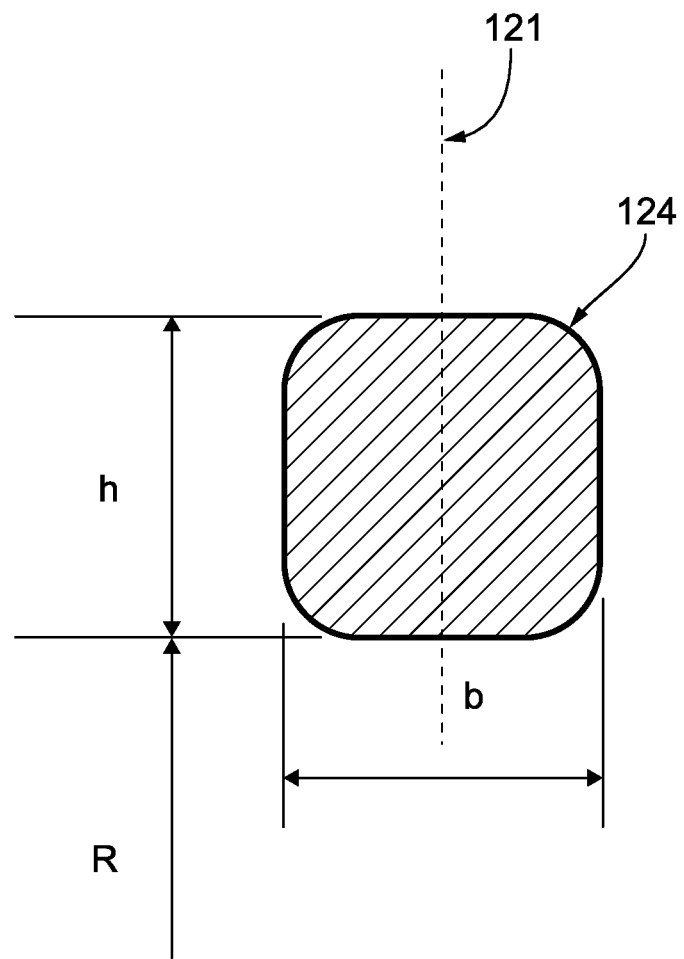
FIG. 11 is a schematic cross-sectional view of the volute of FIG. 9, showing the radial cross-section identified in FIG. 9 as 11-11.

TABLE 1 is a coordinate Table defining the main volute section flow passage corresponding to the cross-section in FIG. 7;

TABLE 2 is a coordinate Table defining the main volute section flow passage corresponding to the cross-section in FIG. 8; and TABLE 3 is a coordinate Table defining the volute exit bend flow passage corresponding to the cross-section in FIG. 11.

DETAILED DESCRIPTION OF THE PREFERRED EMBODIMENTS

Figure 1:
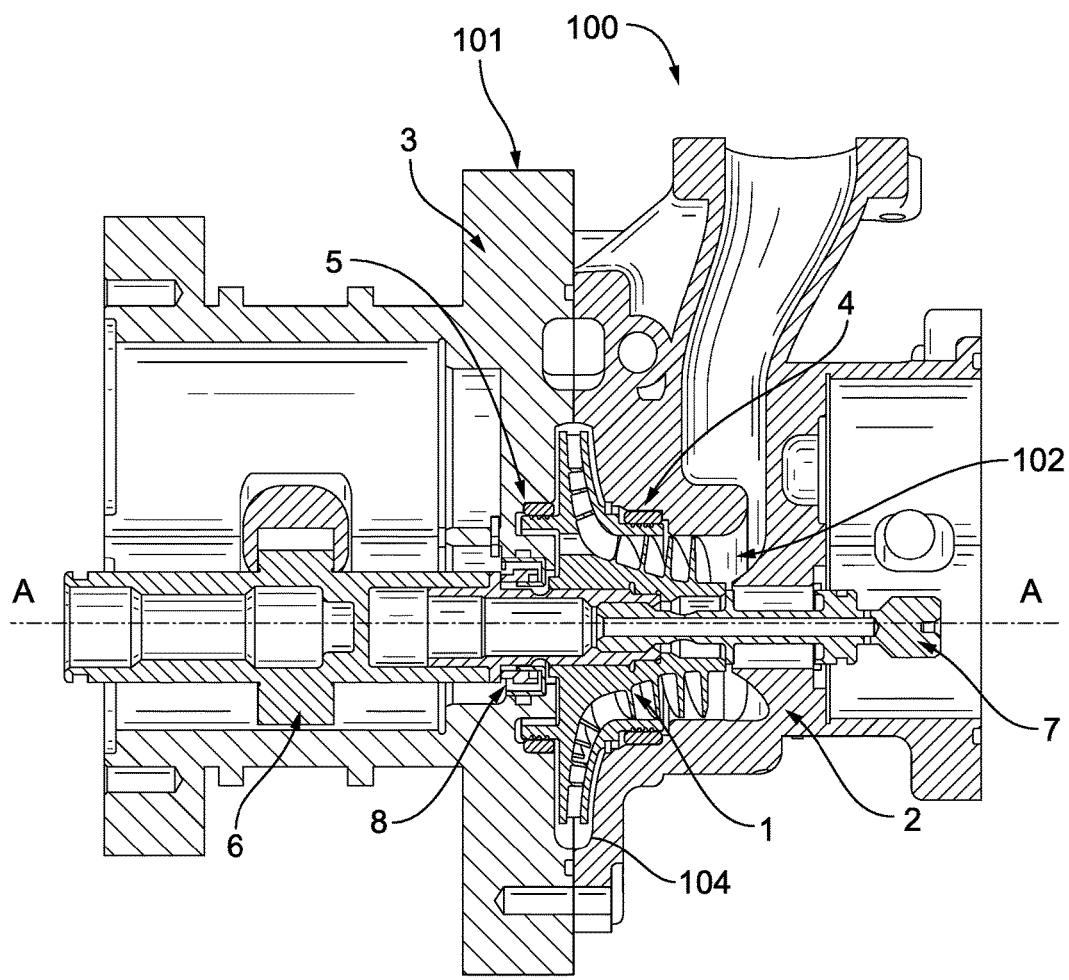
FIG. 1 is a cross-sectional view of an exemplary embodiment of an engine mounted boost pump constructed in accordance with the present disclosure, showing the volute defined between the boost housing cover and the pump housing.
Figure 2:
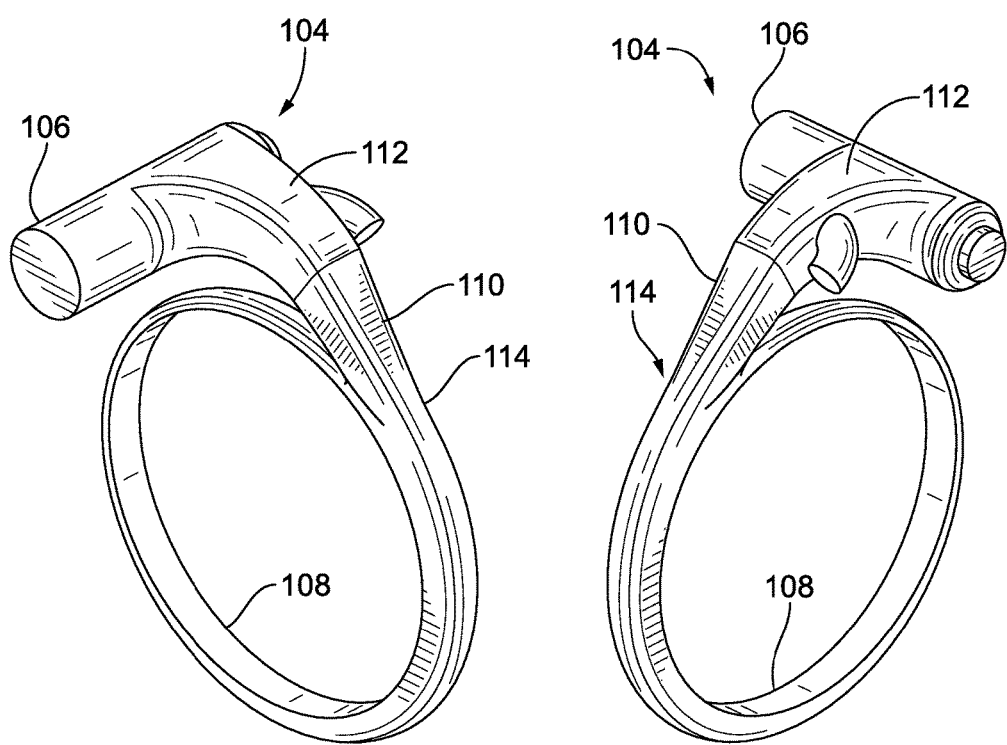
FIGS. 2a and 2b are perspective views of opposite sides of the boost stage volute fluid region of the volute of FIG. 1, i.e., wherein the negative space of the volute is shown as a solid for sake of clarity.

Reference will now be made to the drawings wherein like reference numerals identify similar structural features or aspects of the subject disclosure. For purposes of explanation and illustration, and not limitation, a partial view of an exemplary embodiment of a boost pump in accordance with the disclosure is shown in FIG. 1 and is designated generally by reference character 100. Other embodiments of boost pump assemblies in accordance with the disclosure, or aspects thereof, are provided in FIGS. 2-11, as will be described.

Embodiments disclosed herein of the volute collectors can be developed by analytical and empirically based similitude models, along with quasi three dimensional flow calculations, and supported by verification simulations using computational fluid dynamics (CFD) models including thermal analysis and fluid solid interaction.

The volute collector, as the name suggests, collects the flow which is leaving the impeller in an almost tangential direction and with high velocities close to that of the impeller tip tangential velocity and directs it to the pump discharge port. From the pump inlet to the impeller exit port, the only element which adds power to the fluid is the impeller. The power is supplied at the shaft by the pump driver. A successful pump is expected to deliver the flow at the pump discharge port with relatively low velocities, at the required pressure rise above pump inlet pressure and with the best efficiency possible.

Impellers by themselves can present high efficiencies between 75% and 95% depending on the pump size in terms of flow and running speed. The flow stream leaving the impeller exit port, aside from containing potential energy in the form of static pressure, also contains a fair amount of kinetic energy due to the high velocity of the fluid stream. Hence, in order to achieve a high overall efficiency for the entire pump, the volute collector must provide a high degree of pressure recovery, or transfer as much kinetic energy as possible into potential energy, or static pressure. To achieve this goal, the volute collector cross section is progressively increased in the direction of flow, which forces the fluid stream to slow down and, in the process, energy is recovered in the form of pressure.

The volute collector is composed of three distinct sections. The first section, which wraps around the impeller exit port, is called the main volute section herein. The second section, which is a straight conical segment with a roundish cross section, is called the diffuser. The last section, which turns the flow from a normal plane relative to the impeller axis to an axial direction, is called the exit bend. The need for the exit bend is dictated by the specific requirements of the application on hand. The volute collector shape and size can be optimized by using empirically based analytical calculations along with CFD flow simulations. The CFD flow simulations are run on the volute collector as a stand-alone element and also in conjunction with the rotating impeller by means of steady state and transient unsteady analysis. The successful design is selected on the basis of best efficiency, which is ensured by avoiding excessive growth of the boundary layers, flow separation, and generation of eddies. Most particular to the aircraft jet engine mounted fuel boost pump applications, where reducing the heat dissipated in the fuels system over the entire flight envelop is of primary concern, the best efficiencies are needed towards the lower flows. That is so because the time the pump operates at high flow is limited to take off and part of the climb, while the majority of the flight time is spend during cruise and flight idle descent where the engine flow demand is quite low. To satisfy this necessity, the volute collector design favors the low flow conditions, where dynamic instability or pulsating flows can develop and must be suppressed.

From a manufacturing point of view, the volute collector can be cast or machined. The embodiments of volute collectors disclosed herein are specifically prepared for machining. The volute collector is split into two sections by an imaginary plane normal to the pump axis of rotation (axis A in FIG. 1). The first section is machined into the boost housing cover 2, while the second section is machined in the pump housing 3 separating the boost pump 100 from the main pump. The shape of the volute collector is designed in such a way to allow for the complete machining of the volute passages by means of using only one end mill cutter on a four axis milling machine, which reduces cost and increases productivity. As a result of this approach, a better control is maintained on the size and shape of the volute collector along with obtaining a better surface finish, which translates into higher efficiencies and pressure recovery.

FIG. 1 shows a cross-sectional view of the engine mounted boost pump 100 having the pump axis of rotation, longitudinal axis A. The engine mounted boost pump 100 includes a shrouded impeller 1, a boost housing cover 2, a pump housing 3, a front labyrinth seal 4, a rear labyrinth 5, and a rear side face seal 8. Also shown are elements of the main fuel pump of gear pump type like drive gear 6 and motive stage coupling shaft 7.

During operation fuel flow enters through the inlet 102 from the far right side opening of the boost pump housing cover 2 flowing axially from right to left. The fuel flow then enters first the inducer blades of the rotating impeller 1 where the pressure is raised and the eventual air and vapor phase present in the mixture are compressed back in to solution such by the time the fuel flow reaches the impeller blades most of the mixture is in the liquid phase. The fuel flow then enters the impeller radial blade section where the majority of the pressure rise takes place, while the fluid absolute velocity is greatly increased. The fuel flow leaves the impeller 1 at its outside diameter exit port 106 under significantly larger pressure and with large velocity in an almost tangential direction. At this location, the flow stream contains potential energy based on the actual static pressure and a good amount of kinetic energy due to the high flow velocity. It is the purpose of this collector of volute 104 to gradually capture this flow stream, progressively slow its velocity down and guide it towards the boost pump discharge port. By slowing down the flow stream velocity in a smooth way and without generating of any eddies, the majority of the kinetic energy of the flow stream is transformed into potential energy, or pressure. At the exit port 106 (shown in FIG. 5) of the boost pump 100, flow is delivered to the downstream system at much higher pressure than that from the boost pump inlet 102 and with a relatively low velocity commonly used in the fuel system plumbing to deliver the fuel flow throughout the system, e.g., throughout a fuel system on an aircraft.

Figure 3:
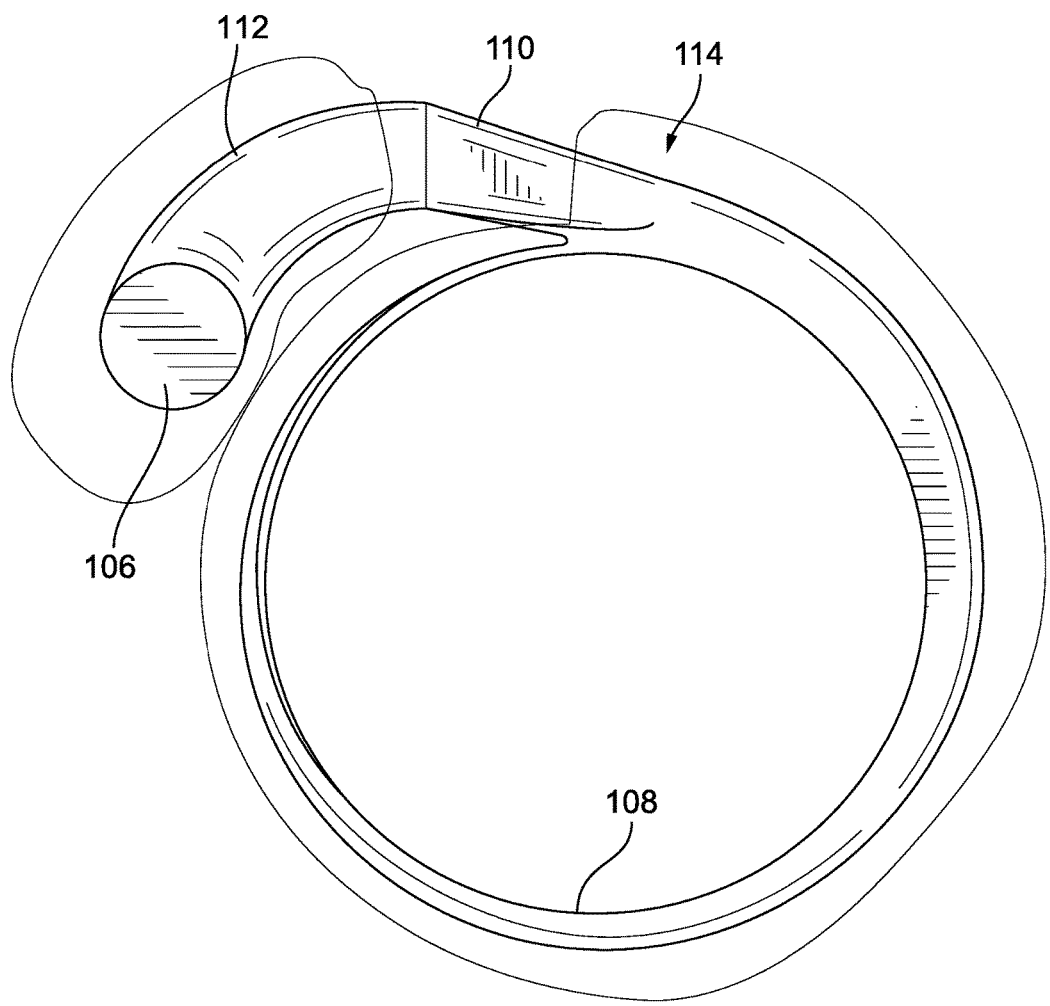
FIG. 3 is an outlet end view of the boost stage volute of FIG. 1, outlining the main components, main volute section, volute exit bend, and the diffuser connecting the two.

FIGS. 2a, 2b, and 3 show a perspective views and a front view, respectively, of the fluid zone of the collector of volute 104. The volute 104 consists of the main volute section 108, the diffuser section 110, and the volute exit bend 112. The main volute section 108 starts at the minimum radial spacing between the impeller 1 and the volute 104, which is called cut water, and follows an increased cross sectional area around the impeller circumference to a full 360 degrees around axis A. The shape of the radial cross sections of the volute 104 are progressively changed to accommodate space constraints and, or, ease of manufacturing constraints. The fluid stream velocity in the volute 104 is progressively reduced from the high tangential velocities leaving the impeller 1 to about half of that at the start of the diffuser section 110. The interface between the main volute section 108 and the diffuser section 110 is the throat 114. The diffuser section 110 is a straight section of continuously increasing area, where the fluid stream velocity is farther reduced to half, or a third of its value at the throat. The volute exit bend 112 is intended to make the transition between the exit end of the diffuser section 110 and the exit port 106 (shown in FIG. 5). This section, the volute exit bend 112, can include a double turn. The shape of the entire volute passage is shaped based on analytical calculations and optimized by means of CFD flow simulations such as to avoid the formation of eddies or separation from the walls and to minimize the viscous losses.

Figure 4:
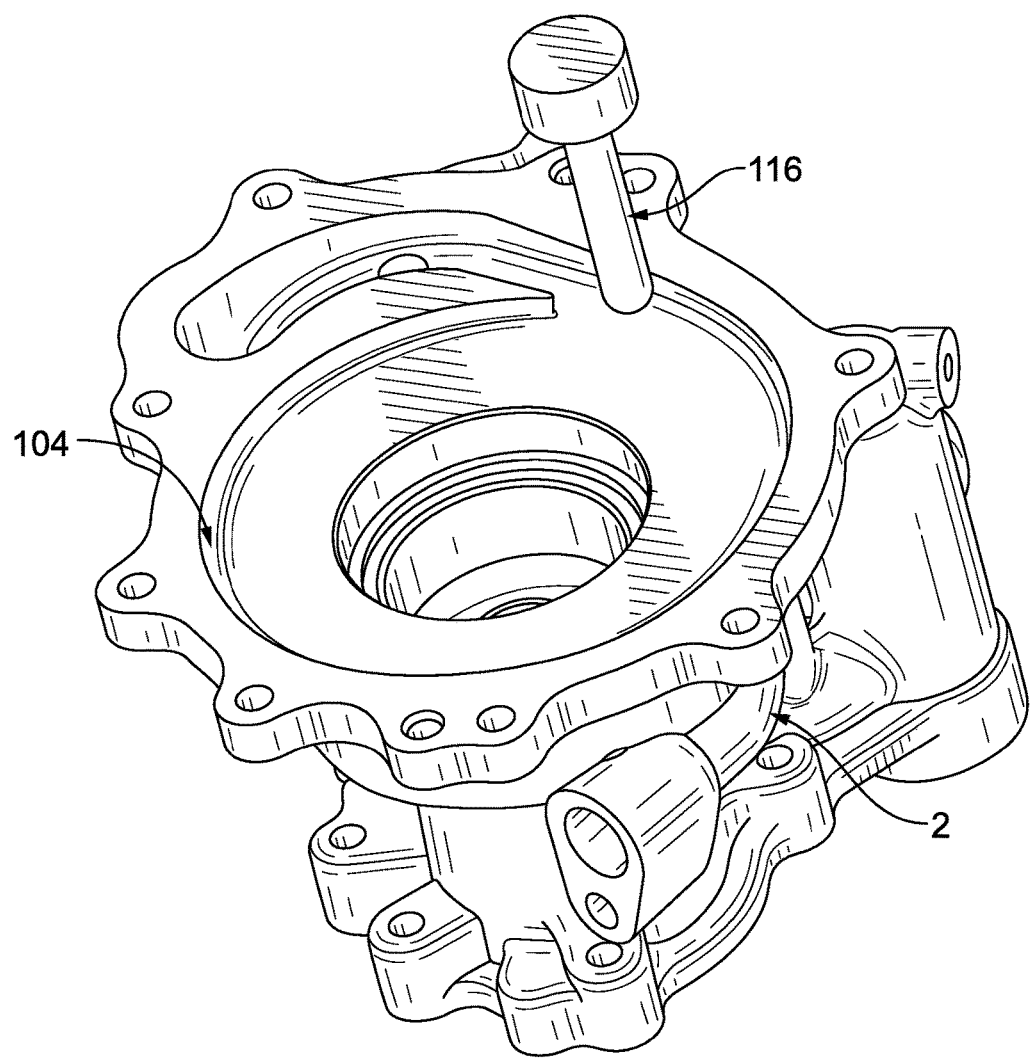
FIG. 4 a perspective view of the housing cover of FIG. 1, showing the volute passage and the typical tool cuter attitude used in the milling operation.
Figure 5:
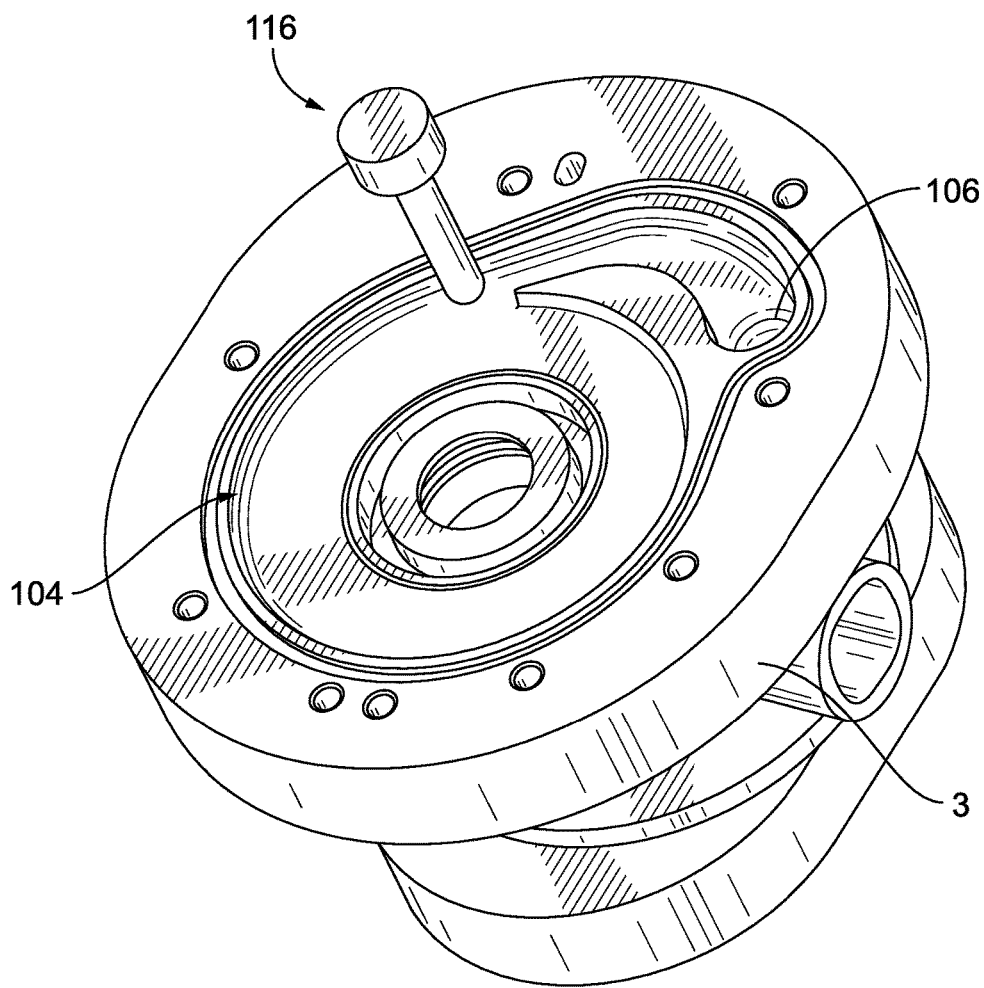
FIG. 5 a perspective view of the pump housing of FIG. 1, showing the volute passage and the typical tool cuter attitude used in the milling operation.

FIGS. 4 and 5 show the housing cover 2 and the pump housing 3 respectively, which both contain the surfaces of the passages of volute 104, and the attitude of the end mill cutter 116 used to machine the volute profile. The geometry of the volute 104 makes it possible to machine the elaborate three dimensional surfaces of the volute passages by using only one cutter on a four axis milling center.

Figure 6:
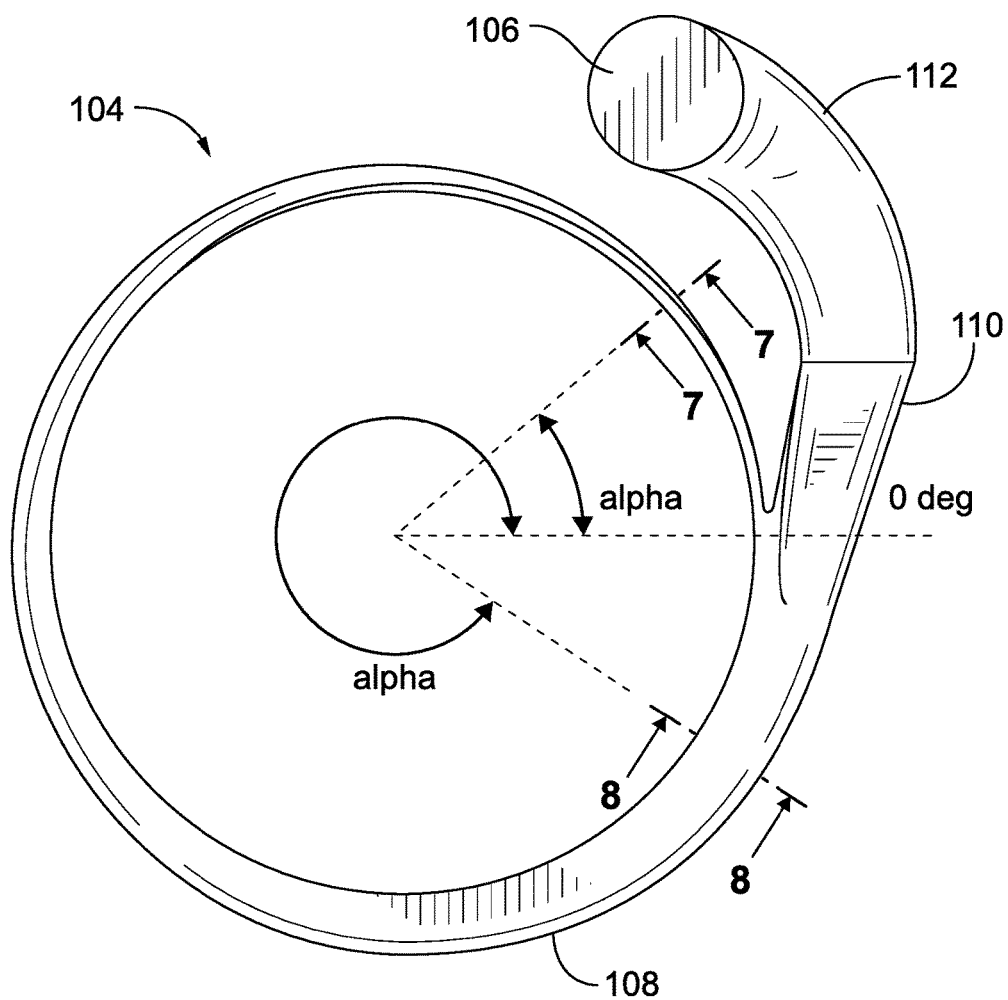
FIG. 6 is a schematic view of the volute of FIG. 1, showing volute geometry dimensioning scheme corresponding to TABLES 1 and 2 below.
Figure 9:
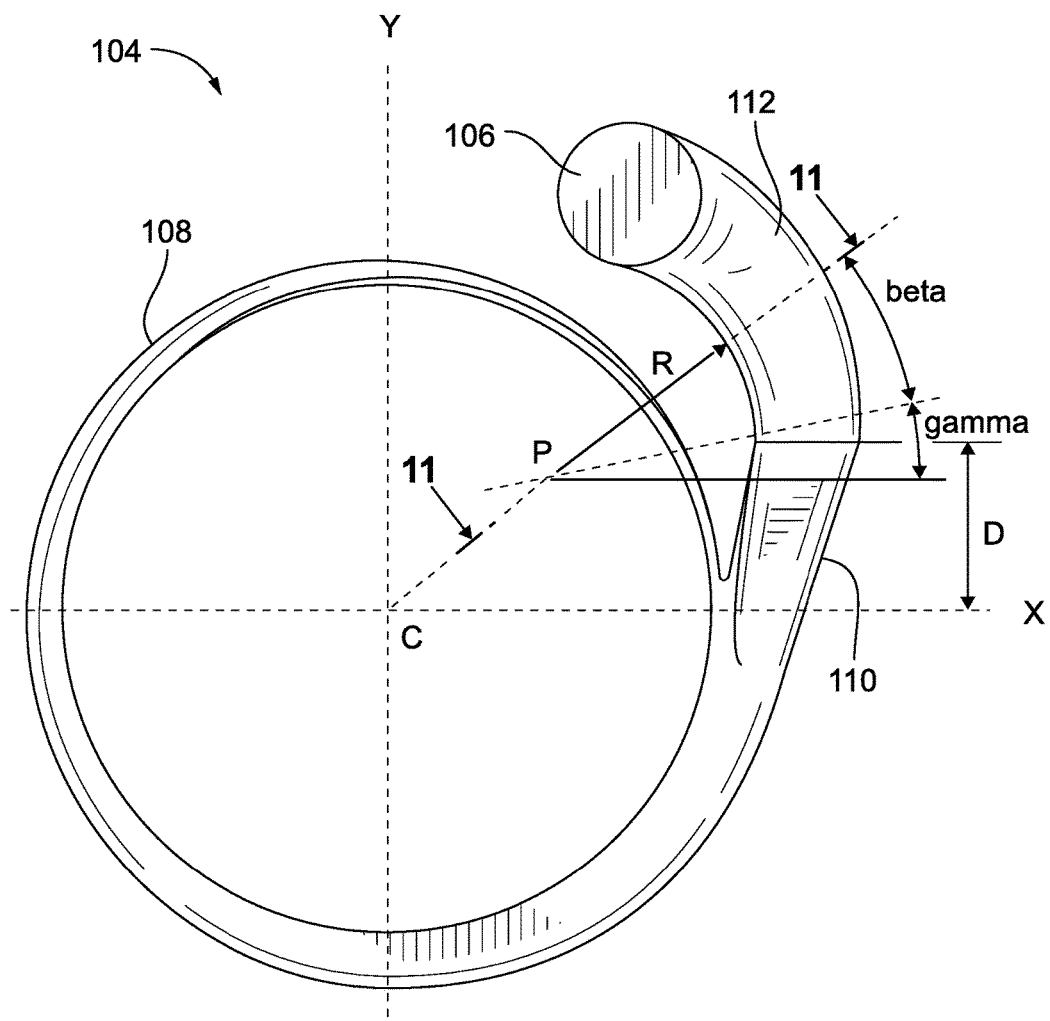
FIG. 9 is a schematic view of the volute of FIG. 1, showing the volute exit bend geometry dimensioning scheme corresponding to TABLE 3 below.
Figure 10:
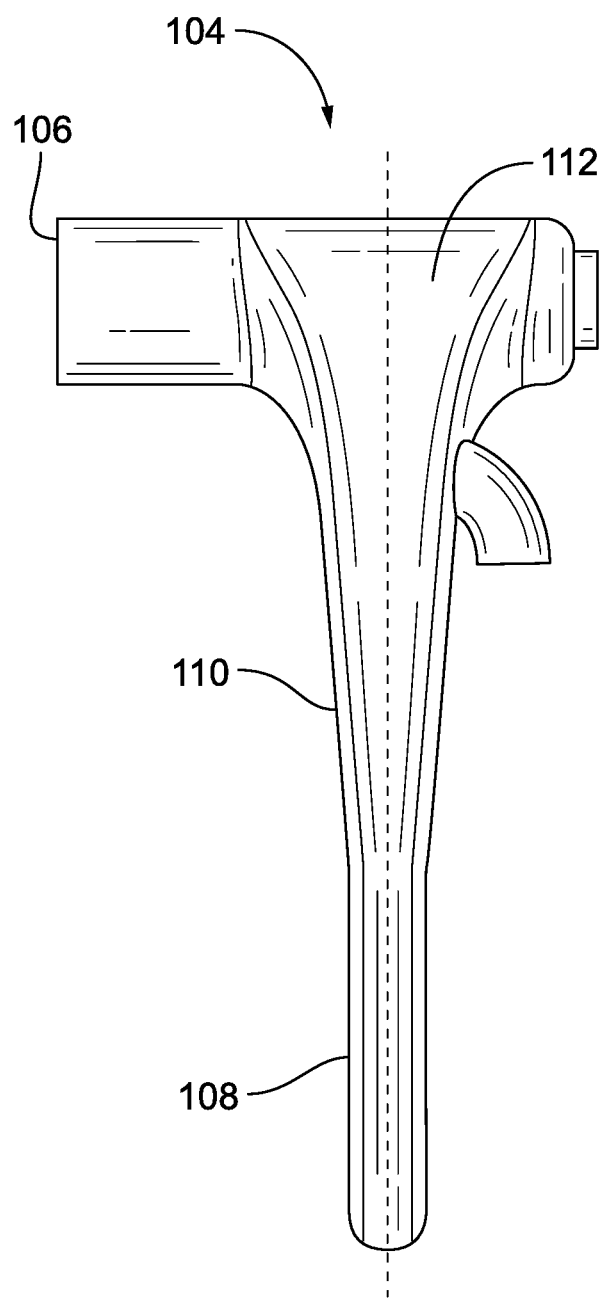
FIG. 10 is a schematic view of the volute of FIG. 9, showing the volute from a view normal to the view of FIG. 10.

FIGS. 6-8 define volute geometry for volute 104 and identify and detail cross-sections of the main volute section 108 and show dimensions to correlate with TABLES 1 and 2 as explained below. FIGS. 9-11 define volute geometry for volute 104 and identify cross-sectional features of the volute bend 112 with dimensions to correlate with TABLE 3 as explained below.

TABLES 1-3 define the volute and volute bend geometry and show the values for the dimensions in accordance with FIGS. 9-11 to four decimal points. Acceptable manufacturing tolerances of +/−0.010 inches on surface profile can be used to maintain the mechanical and aerodynamic function of these components.

The volute collector passages include a circumferentially extending volute defining a plurality of cross sectional surfaces, e.g., the surfaces identified in cross-section in FIGS. 7, 8 and 11, defined in a the housing 101 (shown in FIG. 1) that includes housing cover 2 and pump housing 3. The plurality of surfaces is defined as a set of dimensions set out in TABLES 1 through 3. The following is an explanation, in conjunction with FIGS. 7, 9, and 11, of the columns identified in TABLES 1-3. The table values in TABLES 1-3 are normalized. Those skilled in the art will ready appreciate that the values can be multiplied by any suitable factor to, e.g., the dimensions can be taken as inches, centimeters, or can be multiplied by any suitable factor for a given application. Alpha is an angular measure circumferentially around the volute starting from a point where the diffuser section is tangent to a main volute section. The following are the column identifiers: h is a radial channel span distance in the volute 104, h_0 is a radial span in an exit bend 112 of the volute 104, rbase is a radius from the axis A to a radially inward extreme 103 of the volute, b is a volute thickness measured in a direction parallel to the axis A, and Beta in FIG. 9 is an angular measure circumferentially around the center point C of radius R measured starting from an angle gamma that is itself 10° counterclockwise from being parallel to alpha equals 0° in FIG. 6. R is the inner radius of the exit bend 112 measured from a point P. Point P has Cartesian X and Y coordinates listed by section in TABLE 3 measured from the center point C, which is where axis A intersects the plane of the housing split line 121 (split line 121 is identified in FIGS. 7, 8, and 11). The axes X and Y for the X and Y coordinates of point P are identified in FIG. 9. The Z coordinate of point P, in the direction orthogonal to the X and Y axes labeled in FIG. 9, is zero for all sections of the exit bend 112. In TABLE 2, the X, Y, and Z coordinates of point P are labeled O1_X, O2_Y, and O3_Z, respectively which are normalized with the same normalization as the rest of TABLES 1-3. D in FIG. 9 is an offset distance from the 0° line up to where the exit bend 112 begins. D has a value of 1.350, normalized the same as the coordinates given in TABLES 1-3.

A split line, identified in FIGS. 7, 8, and 11 as housings split line 121, is defined between the housing cover 2 and the center plate 3, wherein the split line is centered axially along axis A of FIG. 1 in the main volute section 108. The diffuser section 110 is in fluid communication with the exit port 106 oriented parallel with the volute thickness b.

As shown in FIG. 7, two adjacent corners 120 of the volute 104 in a radial cross-section of the volute defined by TABLE 1 include a normalized fillet radius of 0.032, normalized with in common with TABLE 1. As also shown in FIG. 7, a central radius 122 between two adjacent corners 120 of a volute section of the volute defined by TABLE 1 has a normalized value of 0.15625, normalized in common with TABLE 1. There is a normalized central radius 122 of 0.15625 in one volute surface parallel to dimension b in a section of the volute defined by TABLE 2, normalized in common with TABLE 2. As shown in FIG. 11, all four corners in radial cross-section of the exit bend 112 of the volute have a fillet radius 124 with a normalized value of 0.15625, normalized in common with TABLE 3.

A method of forming a volute in a boost fuel pump includes forming axially opposed portions of a volute in a housing cover and an opposed pump housing, wherein the volute defines a plurality of cross-sections defined in the housing cover and pump housing, wherein the plurality of surfaces are defined as described above. The method can include forming the volute geometry in the pump housing and the opposed housing cover using a single four axis milling cutter.

The methods and systems of the present disclosure, as described above and shown in the drawings, provide for boost pumps with superior properties including form factor and fluid dynamic efficiency. While the apparatus and methods of the subject disclosure have been shown and described with reference to preferred embodiments, those skilled in the art will readily appreciate that changes and/or modifications may be made thereto without departing from the scope of the subject disclosure.

TABLE 1

| Section number | Alpha [deg] | r base | h | h_0 | b |
|---|---|---|---|---|---|
| 2 | 15 | 1.9750 | 0.0593 | 0.0500 | 0.3800 |
| 3 | 20 | | 0.0664 | | |
| 4 | 25 | | 0.0726 | | |
| 5 | 30 | | 0.0784 | | |
| 6 | 35 | | 0.0839 | | |
| 7 | 40 | | 0.0893 | | |
| 8 | 45 | | 0.0945 | | |
| 9 | 50 | | 0.0995 | | |
| 10 | 55 | | 0.1046 | | |
| 11 | 60 | | 0.1095 | | |
| 12 | 65 | | 0.1143 | | |
| 13 | 70 | | 0.1190 | | |
| 14 | 75 | | 0.1239 | | |
| 15 | 80 | | 0.1286 | | |
| 16 | 85 | | 0.1332 | | |
| 17 | 90 | | 0.1380 | | |
| 18 | 95 | | 0.1426 | | |
| 19 | 100 | | 0.1473 | | |

TABLE 1-continued

| Section number | Alpha [deg] | r base | h | h_0 | b |
|---|---|---|---|---|---|
| 20 | 105 | | 0.1519 | | |
| 21 | 110 | | 0.1567 | | |
| 22 | 115 | | 0.1613 | | |
| 23 | 120 | | 0.1660 | | |
| 24 | 125 | | 0.1708 | | |
| 25 | 130 | | 0.1755 | | |
| 26 | 135 | | 0.1802 | | |
| 27 | 140 | | 0.1850 | | |
| 28 | 145 | | 0.1898 | | |
| 29 | 150 | | 0.1946 | | |
| 30 | 155 | | 0.1995 | | |
| 31 | 160 | | 0.2045 | | |
| 32 | 165 | | 0.2094 | | |
| 33 | 170 | | 0.2144 | | |

TABLE 2

| Section number | Alpha [deg] | r base | h | h_0 | b |
|---|---|---|---|---|---|
| 34 | 175 | 1.9750 | 0.2194 | 0.0500 | 0.3800 |
| 35 | 180 | | 0.2246 | | |
| 36 | 185 | | 0.2298 | | |
| 37 | 190 | | 0.235 | | |
| 38 | 195 | | 0.2403 | | |
| 39 | 200 | | 0.2457 | | |
| 40 | 205 | | 0.2511 | | |
| 41 | 210 | | 0.2565 | | |
| 42 | 215 | | 0.2621 | | |
| 43 | 220 | | 0.2677 | | |
| 44 | 225 | | 0.2734 | | |
| 45 | 230 | | 0.2792 | | |
| 46 | 235 | | 0.285 | | |
| 47 | 240 | | 0.2908 | | |
| 48 | 245 | | 0.2968 | | |
| 49 | 250 | | 0.3029 | | |
| 50 | 255 | | 0.309 | | |
| 51 | 260 | | 0.3151 | | |
| 52 | 265 | | 0.3214 | | |
| 53 | 270 | | 0.3278 | | |
| 54 | 275 | | 0.3342 | | |
| 55 | 280 | | 0.3406 | | |
| 56 | 285 | | 0.3473 | | |
| 57 | 290 | | 0.3539 | | |
| 58 | 295 | | 0.3607 | | |
| 59 | 300 | | 0.3676 | | |
| 60 | 305 | | 0.3745 | | |
| 61 | 310 | | 0.3815 | | |
| 62 | 315 | | 0.3886 | | |
| 63 | 320 | | 0.3959 | | |
| 64 | 325 | | 0.4032 | | |
| 65 | 330 | | 0.4106 | | |
| 66 | 335 | | 0.4182 | | |
| 67 | 340 | | 0.4258 | | |
| 68 | 345 | | 0.4335 | | |
| 69 | 350 | | 0.4413 | | |
| 70 | 355 | | 0.4563 | | |
| 71 | 360 | | 0.4773 | | |

TABLE 3

| Section number | Beta [deg] | R | b | h | O1_X coord. | O2_Y coord. | O3_Z coord. |
|---|---|---|---|---|---|---|---|
| 1 | 3.75 | 1.245 | 0.6458 | 0.6457 | 0.8289 | 1.1338 | 0.0000 |
| 2 | 7.50 | 1.240 | 0.6587 | 0.6577 | 0.8338 | 1.1347 | |
| 3 | 11.25 | 1.235 | 0.6732 | 0.6698 | 0.8387 | 1.1355 | |
| 4 | 15.00 | 1.230 | 0.6899 | 0.6819 | 0.8437 | 1.3641 | |
| 5 | 18.75 | 1.225 | 0.7096 | 0.6940 | 0.8486 | 1.1372 | |
| 6 | 22.50 | 1.220 | 0.7330 | 0.7060 | 0.8535 | 1.1381 | |
| 7 | 26.25 | 1.215 | 0.7610 | 0.7181 | 0.8585 | 1.1390 | |
| 8 | 30.00 | 1.210 | 0.7942 | 0.7302 | 0.8634 | 1.1399 | |

TABLE 3-continued

| Section number | Beta [deg] | R | b | h | O1_X coord. | O2_Y coord. | O3_Z coord. |
|---|---|---|---|---|---|---|---|
| 9  | 33.75 | 1.205 | 0.8334 | 0.7422 | 0.8683 | 1.1407 | |
| 10 | 37.50 | 1.200 | 0.8793 | 0.7543 | 0.8732 | 1.1416 | |
| 11 | 41.25 | 1.195 | 0.9327 | 0.7664 | 0.8732 | 1.1425 | |
| 12 | 45.00 | 1.190 | 0.9944 | 0.7784 | 0.8781 | 1.1433 | |
| 13 | 48.75 | 1.185 | 1.0651 | 0.7905 | 0.8831 | 1.1442 | |
| 14 | 52.50 | 1.180 | 1.1456 | 0.8026 | 0.8880 | 1.1451 | |
| 15 | 56.25 | 1.175 | 1.2365 | 0.8147 | 0.8929 | 1.1459 | |
| 16 | 60.00 | 1.170 | 1.3387 | 0.8267 | 0.8978 | 1.1468 | |
| 17 | 63.75 | 1.165 | 1.4529 | 0.8388 | 0.9028 | 1.1477 | |
| 18 | 67.50 | 1.160 | 1.5799 | 0.8509 | 0.9077 | 1.1485 | |
| 19 | 71.25 | 1.155 | 1.7203 | 0.8629 | 0.9126 | 1.1494 | |
| 20 | 75.00 | 1.150 | 1.8750 | 0.8750 | 0.9175 | 1.1503 | |

What is claimed is:

1. A volute for a jet engine mounted boost pump comprising:
a circumferentially extending volute defining a plurality of cross sections defined in a housing, wherein the cross sections are defined by a set of dimensions set out in at least one of TABLES 1-3, wherein Alpha is an angular measure circumferentially around the volute starting from a point where a diffuser section is tangent to a main volute section, h is a radial channel span distance in the volute, h_0 is a radial span in an exit bend of the volute, rbase is a radius from an axis of rotation of an impeller that rotates within the pump housing to a radially inward extreme of the volute, b is a volute thickness measured in a direction parallel to the axis, R is an inner radius of the exit bend of the volute measured from a point C having Cartesian coordinates O1_X, O2_Y, and O3_Z, and Beta is an angle angular measure circumferentially around the point C of radius R measured starting from an angle 10° from being parallel to alpha equals 0°.

2. The volute collector as recited in claim 1, wherein the diffuser section is in fluid communication with an exit port of the volute oriented parallel with the volute thickness b.

3. The volute collector as recited in claim 1, wherein the volute geometry is configured to be formed in a pump housing and an opposed housing cover using a single four axis milling cutter.

4. The volute collector as recited in claim 1, wherein the main volute section is defined as a set of dimensions set out in TABLES 1 and 2.

5. The volute collector as recited in claim 4, wherein the diffuser section is defined as a set of dimensions set out in TABLE 3.

6. The volute collector as recited in claim 1, wherein two adjacent corners of the volute in a section of the volute defined by TABLE 1 include a normalized fillet radius of 0.032, normalized with in common with TABLE 1.

7. The volute collector as recited in claim 1, wherein a central radius between two adjacent corners of a volute section of the volute defined by TABLE 1 has a normalized value of 0.15625, normalized in common with TABLE 1.

8. The volute collector as recited in claim 1, wherein there is a normalized central radius 0.15625 in one volute surface parallel to dimension b in a section of the volute defined by TABLE 2, normalized in common with TABLE 2.

9. The volute collector as recited in claim 1, wherein all four corners in radial cross-section of the exit bend of the volute have a fillet radius with a normalized value of 0.15625, normalized in common with TABLE 3.

10. A boost pump comprising:
a housing cover and a pump housing engaged opposite to the housing cover, wherein volute passages are defined between the housing cover and the pump housing, wherein the volute passages include a circumferentially extending volute defining a plurality of cross sections defined in a housing including the pump housing and the housing cover, wherein the plurality of surfaces are defined as a set of dimensions set out in at least one of TABLES 1 through 3, wherein Alpha is an angular measure circumferentially around the volute starting from a point where a diffuser section is tangent to a main volute section, h is a radial channel span distance in the volute, h_0 is a radial span in an exit bend of the volute, rbase is a radius from an axis of rotation of an impeller that rotates within the pump housing to a radially inward extreme of the volute, b is a volute thickness measured in a direction parallel to the axis, and R is an inner radius of the exit bend of the volute measured from a point C having Cartesian coordinates O1_X, O2_Y, and O3_Z, and Beta is an angle angular measure circumferentially around the point C of radius R measured starting from an angle 10° from being parallel to alpha equals 0°.

11. The boost pump as recited in claim 10,
wherein a split line is defined between the housing cover and the pump housing, and wherein the split line is centered axially in the main volute section.

12. The boost pump as recited in claim 10, wherein the diffuser section is in fluid communication with an exit port of the volute oriented parallel with the volute thickness b.

13. The boost pump as recited in claim 10, wherein the main volute section is defined as a set of dimensions set out in TABLES 1 and 2.

14. The boost pump as recited in claim 10, wherein the diffuser section is defined as a set of dimensions set out in TABLE 3.

15. The boost pump as recited in claim 10, wherein two adjacent corners of the volute in a section of the volute defined by TABLE 1 include a normalized fillet radius of 0.032, normalized with in common with TABLE 1.

16. The boost pump as recited in claim 10, wherein a central radius between two adjacent corners of a volute section of the volute defined by TABLE 1 has a normalized value of 0.15625, normalized in common with TABLE 1.

17. The boost pump as recited in claim 10, wherein there is a normalized central radius 0.15625 in one volute surface parallel to dimension b in a section of the volute defined by TABLE 2, normalized in common with TABLE 2.

18. The boost pump as recited in claim 10, wherein all four corners in radial cross-section of the exit bend of the volute have a fillet radius with a normalized value of 0.15625, normalized in common with TABLE 3.

19. A method of forming a volute in a boost fuel pump comprising: forming axially opposed portions of a volute in a housing cover and an opposed pump housing, wherein the volute defines a plurality of cross sections defined in the housing cover and pump housing, wherein the plurality of cross sections are defined as a set of dimensions set out in at least one of TABLES 1 through 3, wherein Alpha is an angular measure circumferentially around the volute starting from a point where a diffuser section is tangent to a main volute section, h is a radial channel span distance in the volute, $h\_0$ is a radial span in an exit bend of the volute, rbase is a radius from an axis of rotation of an impeller that rotates within the pump housing to a radially inward extreme of the volute, b is a volute thickness measured in a direction parallel to the axis, R is an inner radius of the exit bend of the volute measured from a point C having Cartesian coordinates $O1\_X$, $O2\_Y$, and $O3\_Z$, and, and Beta is an angle angular measure circumferentially around the point C of radius R measured starting from an angle 10° from being parallel to alpha equals 0°.

20. The method as recited in claim 19, wherein the forming includes forming the volute geometry in the pump housing and the opposed housing cover using a single four axis milling cutter.

\* \* \* \* \*